(12) United States Patent
Kofuji

(10) Patent No.: US 11,669,654 B2
(45) Date of Patent: Jun. 6, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Makiko Kofuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 16/684,399

(22) Filed: Nov. 14, 2019

(65) Prior Publication Data

US 2020/0159877 A1  May 21, 2020

(30) Foreign Application Priority Data

Nov. 21, 2018 (JP) .............................. JP2018-218573

(51) Int. Cl.
- *G06F 30/20* (2020.01)
- *B65H 5/06* (2006.01)
- *B65H 5/38* (2006.01)
- *B65H 7/20* (2006.01)

(52) U.S. Cl.
CPC .............. *G06F 30/20* (2020.01); *B65H 5/062* (2013.01); *B65H 7/20* (2013.01); *B65H 2408/40* (2013.01); *B65H 2557/24* (2013.01)

(58) Field of Classification Search
CPC ...... B65H 2408/40; B65H 5/062; B65H 7/20; B65H 2557/24; G06F 30/20; G06F 30/23; G06F 2113/24; G06K 15/408; G06K 15/4085
See application file for complete search history.

(56) References Cited

U.S. PATENT DOCUMENTS

2016/0292326 A1\* 10/2016 Tsuchiya ............ G06K 15/4085

FOREIGN PATENT DOCUMENTS

| JP | 11-195052 A | | 7/1999 |
|---|---|---|---|
| JP | 2005085003 A | \* | 3/2005 |
| JP | 2006-113725 A | | 4/2006 |
| JP | 2006-155566 A | | 6/2006 |
| JP | 2008-139998 A | | 6/2008 |
| JP | 2013073399 A | \* | 4/2013 |
| JP | 2014225203 A | \* | 12/2014 |

\* cited by examiner

*Primary Examiner* — Luis A Gonzalez
(74) *Attorney, Agent, or Firm* — Canon U.S.A., Inc., IP Division

(57) ABSTRACT

Apparatus and method is provided for simulating behavior of a flexible medium for a plurality of times under different conditions. A component inside the conveyance path is displayed together with a plurality of locations in which abnormal behavior of the flexible medium has occurred based on a result of the simulation.

15 Claims, 10 Drawing Sheets

FIG.8

| FILE NAME | CONVEYANCE CONDITION | | | LOCATION IN WHICH JAM HAS OCCURRED | | | | | |
|---|---|---|---|---|---|---|---|---|---|
| | PAPER TYPE | CURL | ... | RP1-RP2 | RP2-RP3 | RP3-RP4 | RP4-RP5 | ... | ERROR POSITION |
| PATH1-AP110 | AP110 | YES | ... | ○ | ○ | ○ | ○ | ... | |
| PATH1-AP120 | AP120 | YES | ... | ○ | ○ | × | | ... | ... |
| ... | ... | ... | ... | ... | ... | ... | ... | ... | ... |
| PATH3-BP230 | BP230 | NO | ... | ○ | × | | | ... | ... |
| PATH3-BP240 | BP240 | YES | ... | × | | | | ... | |
| ... | ... | ... | ... | ... | ... | ... | ... | ... | ... |

JAM DISPLAY
☐ POSITION
☑ TABLE

FILE | CONVEYANCE PATH | FLEXIBLE MEDIUM | CONVEYANCE CONDITION | CALCULATION & DISPLAY

150%

INFORMATION PROCESSING APPARATUS, INFORMATION PROCESSING METHOD, AND STORAGE MEDIUM

BACKGROUND

Field

The present disclosure relates to an information processing apparatus that simulates behavior of a sheet-shaped flexible medium that moves inside a conveyance path.

Description of the Related Art

When designing a conveyance path in an image forming apparatus such as a copier and a laser beam printer, functions of a designed object are studied under various conditions before the object is actually created. Such study can reduce not only the man-hours necessary for prototype manufacturing and prototype testing, but also a development period and a cost. For such purposes, behavior of a sheet-shaped flexible medium (e.g., paper and a sheet) that moves inside a conveyance path in an image forming apparatus is analyzed by computer simulation so that the design of the conveyance path can be studied based on the analysis result.

Conventionally, a design assisting system (Japanese Patent Application Laid-Open No. H11-195052) has been discussed as a technique for simulating behavior of a flexible medium. The design assisting system expresses a flexible medium in a finite element based on the finite element method, determines contact between the flexible medium and a guide or a roller inside the conveyance path, and numerically solves an equation of motion, thereby evaluating a conveyance resistance or a contact angle between the flexible medium and the guide.

To understand the motion of the flexible medium, an equation of motion of the flexible medium discretely represented in a finite element or a mass-spring system is formulated, and an analysis target time is divided into time steps (steps of time) having a finite width. Then, acceleration, speed, and displacement of unknown quantities are sequentially determined for each step from a time 0, and the resultant numeric values are time-integrated, so that behavior of the flexible medium can be expressed. Such an analysis method includes Newmark $\beta$ method, Wilson $\theta$ method, Euler method, and Kutta-Merson method are known.

However, the related-art simulation apparatus identifies a location in which an abnormality has occurred under one condition per simulation. Consequently, if simulations are to be performed under a plurality of conditions, a user needs to set a condition, perform a simulation, and check a result on a simulation basis. Moreover, the user can only review the result of one simulation at a time.

SUMMARY

According to an aspect of the present disclosure, an information processing apparatus that simulates behavior of a sheet-shaped flexible medium that moves inside a conveyance path includes a simulation unit configured to simulate behavior of the flexible medium for a plurality of times under a plurality of different conditions, and a display unit configured to display a component inside the conveyance path together with a plurality of locations in which abnormal behavior of the flexible medium has occurred based on a result of the simulation.

Further features of the present disclosure will become apparent from the following description of exemplary embodiments with reference to the attached drawings.

BRIEF DESCRIPTION OF THE DRAWINGS

FIG. 8 is a display screen of a simulation result.

DESCRIPTION OF THE EMBODIMENTS

<Hardware>

Figure 1:
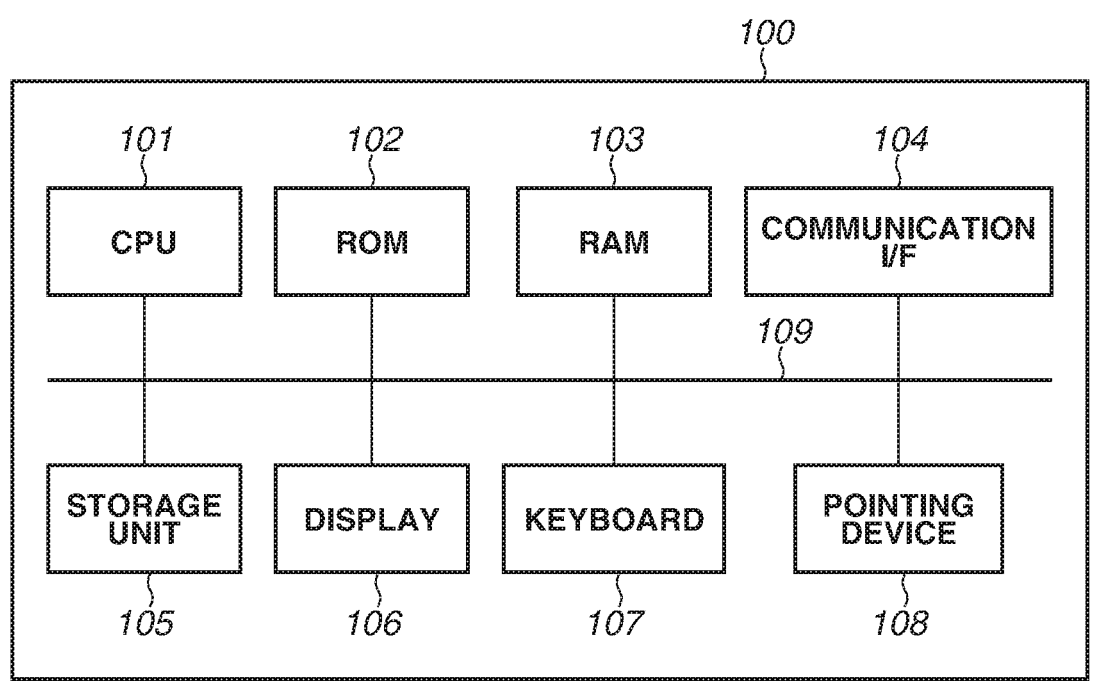
FIG. 1 is a block diagram illustrating a hardware configuration of an information processing apparatus.

FIG. 1 is a diagram illustrating one example of hardware of an information processing apparatus 100 that functions as a simulator according to the present exemplary embodiment.

The information processing apparatus 100 is, for example, an apparatus such as a personal computer (PC) having a communication function. The information processing apparatus 100 includes a central processing unit (CPU) 101, a read only memory (ROM) 102, a random access memory (RAM) 103, a communication interface (I/F) 104, a storage unit 105 such as a hard disk drive (HDD) and a solid state drive (SSD), and a display 106. Moreover, the information processing apparatus 100 includes a keyboard 107, a pointing device 108, and a system bus 109. The CPU 101 uses the RAM 103 as a work memory to execute an operating system (OS) or various programs stored in a memory such as the ROM 102 and the storage unit 105. Moreover, the CPU 101 controls each component via the system bus 109. The CPU 101 loads a program code stored in a memory such as the ROM 102 and the storage unit 105 into the RAM 103 to execute processing that will be described below with reference to a flowchart. The communication I/F 104 is connected to an external apparatus via a wireless/wired module. The display 106 displays various screens for running a simulation. Each of the keyboard 107 and the pointing device 108 receives an input from a user.

<Functional Block Diagram>

Figure 2:
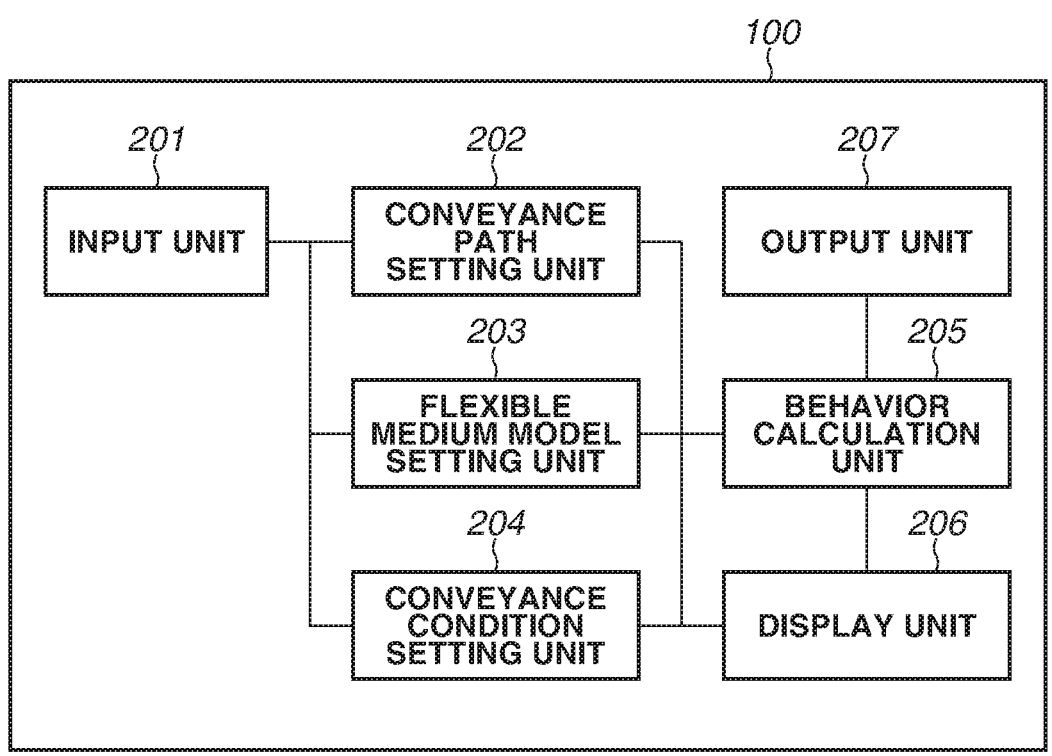
FIG. 2 is a block diagram illustrating a functional configuration of the information processing apparatus.

FIG. 2 is a block diagram illustrating a functional configuration of the information processing apparatus 100. The CPU 101 of the information processing apparatus 100 uses the RAM 103 as a work memory to execute a program stored in the ROM 102, thereby providing various functions illustrated in FIG. 2. The CPU 101 does not necessarily have to execute the entire processing described below. The information processing apparatus 100 can be configured such that the processing is partially or entirely executed by one or a plurality of processing circuits other than the CPU 101.

The information processing apparatus 100 includes functional blocks such as an input unit 201, a conveyance path setting unit 202, a flexible medium model setting unit 203, a conveyance condition setting unit 204, a behavior calculation unit 205, a display unit 206, and an output unit 207.

The input unit 201 is realized by, for example, the keyboard 107, the pointing device 108, and the communication I/F 104. The display unit 206 is realized by, for example, the display 106.

Figure 3:
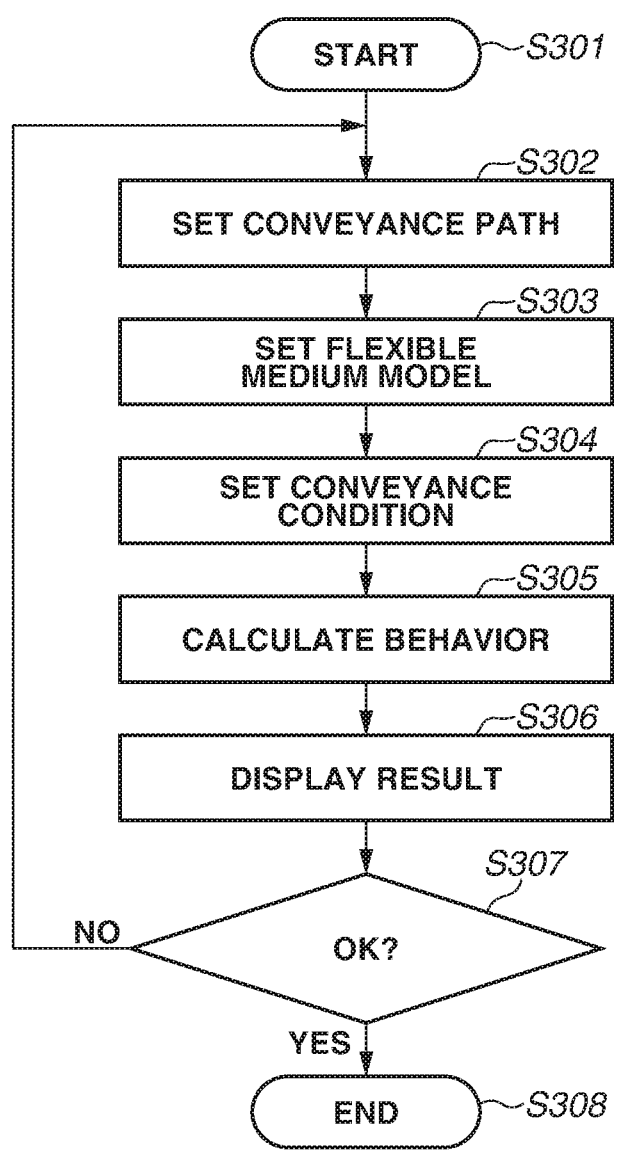
FIG. 3 is a flowchart illustrating an information processing method.

FIG. 3 is a flowchart illustrating processing related to simulation of behavior of a flexible medium. The processing program is stored as a program for design assist and simulation in a storage device (the storage unit 105), and is executed by the CPU 101. Each of the aforementioned components of the information processing apparatus 100 is provided by execution of the processing program stored in the storage unit 105 by the CPU 101.

Hereinafter, the processing according to the present exemplary embodiment will be described with reference to the functional block diagram illustrated in FIG. 2 and the flowchart illustrated in FIG. 3.

In step S301, the CPU 101 stars processing.

In step S302, the conveyance path setting unit 202 sets a conveyance path.

Figure 4:
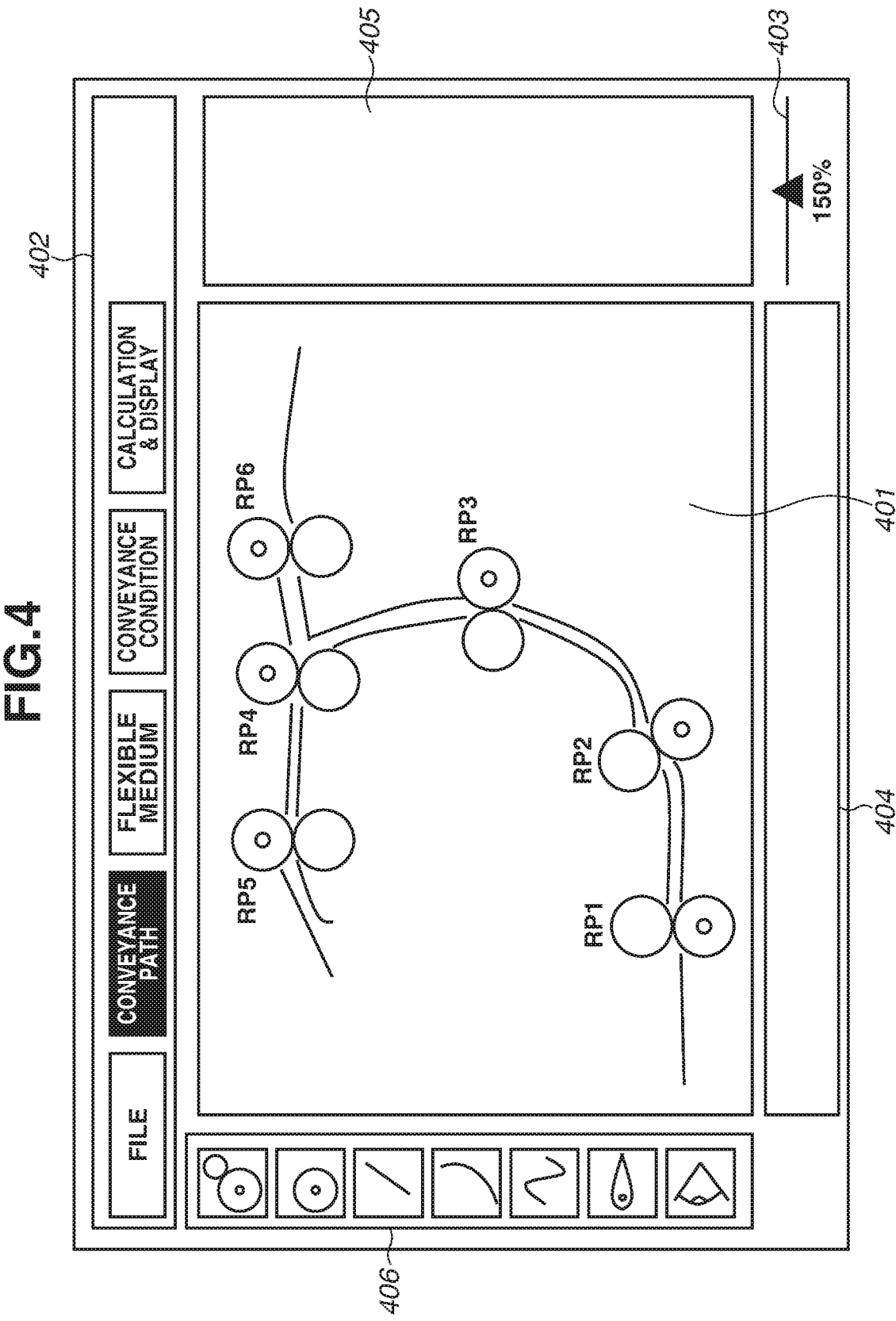
FIG. 4 is a display screen to be displayed when a conveyance path is set.

FIG. 4 is a display screen displayed by the display unit 206 when a conveyance path is set. A main area 401 is an area in which various settings such as a conveyance path setting and a result such as a simulation result are displayed. A menu area 402 is a display area for navigation of an operation change and a file operation. A slide bar 403 is used to determine a scale ratio of the main area 401. A message area 404 is a display area in which various messages are displayed. A setting area 405 is a display area in which attribution information is set. A component selection area 406 is a display area in which each component (e.g., a roller, a conveyance path, and a friction coefficient μ) in setting of the conveyance path is selected. A user operates the input unit 201 to set a conveyance path.

In step S303, the flexible medium model setting unit 203 sets a flexible medium model.

Figure 5:
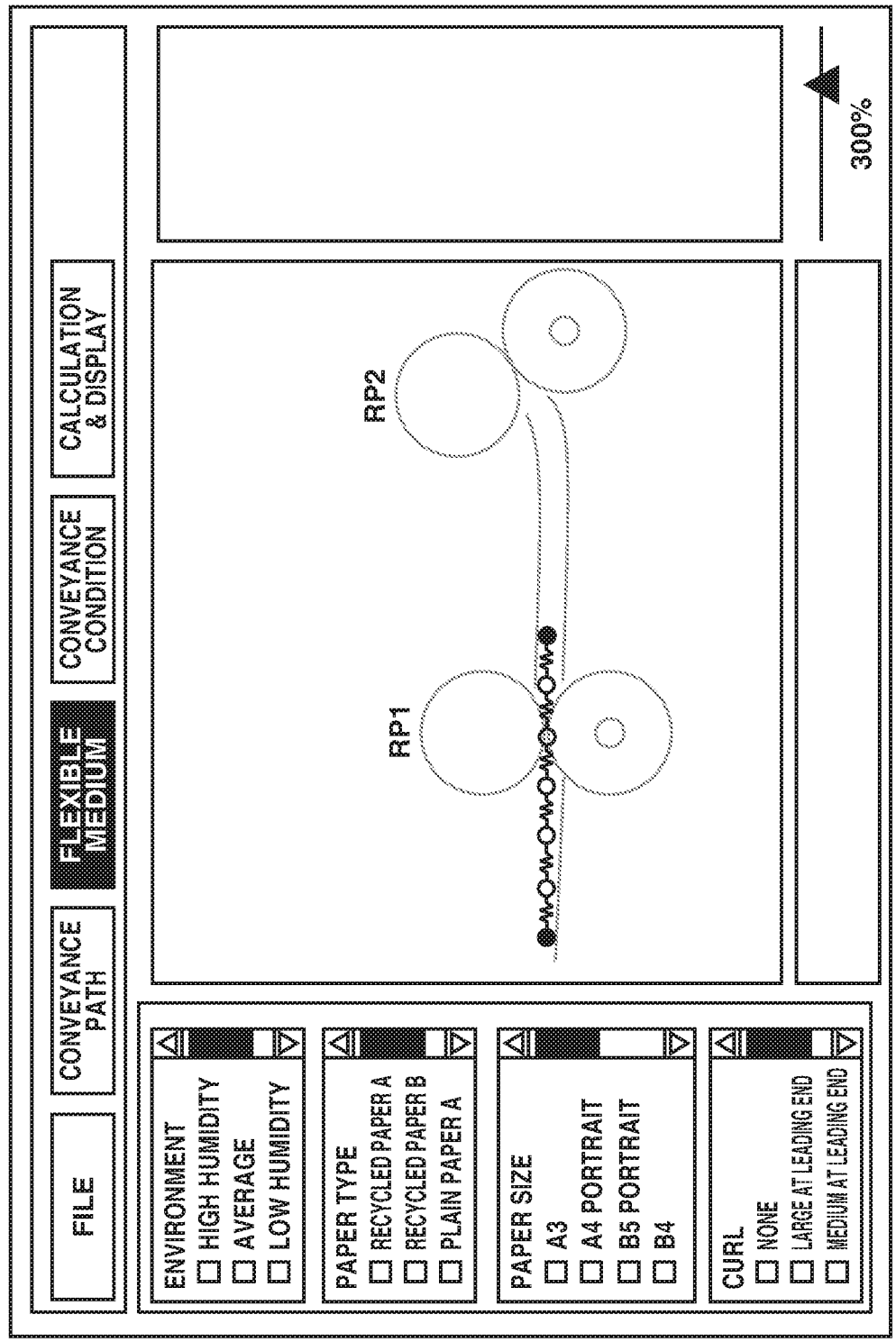
FIG. 5 is a display screen to be displayed when a flexible medium is set.

FIG. 5 is a display screen to be displayed by the display unit 206 when a flexible medium model is set. In the present exemplary embodiment, a flexible medium is defined as a mass-point-spring system elastic model divided into n. Parameters necessary for simulation of a flexible medium behavior include Young's modulus, a density, a thickness, a size, and a curl state of a flexible medium. These parameters can correspond to a flexible medium type (e.g., a paper type). The user operates the input unit 201 to set conditions such as an environment, a paper size, a medium, a curl position, and an initial position via the display screen illustrated in FIG. 5. For example, if the user performs simulations under conditions of "A3", "A4 portrait", and "B5 landscape", the user places checkmarks in checkboxes of the respective items.

The simulations are performed for all of the combinations of the conditions of respective items selected by the user. For example, if two environments, eight paper sizes, 30 media, and three curl states of conditions are selected, simulations are executed for 1440 times based on 2×8×30×3=1440. Conventionally, a user has set a combination of conditions on a one-by-one basis, and then perform simulations for all of the combinations of the conditions. Thus, the workload of the user has been very high. According to the present exemplary embodiment, since the combinations of the conditions can be automatically set, the workload of the user can be markedly reduced.

In step S304, the conveyance condition setting unit 204 sets a conveyance condition.

Figure 6:
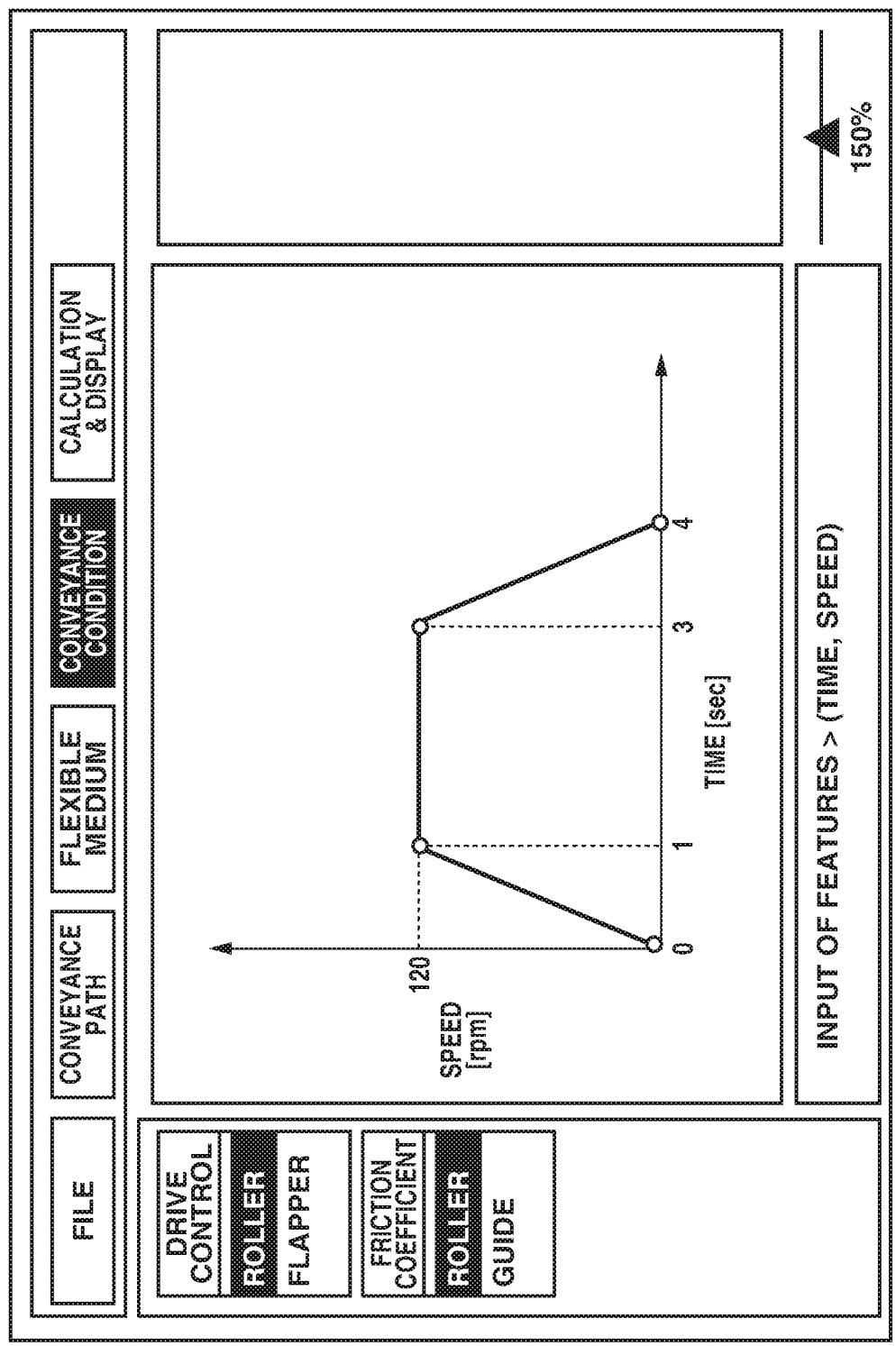
FIG. 6 is a display screen to be displayed when a conveyance condition is set.

FIG. 6 is a display screen to be displayed by the display unit 206 when a conveyance condition is set. FIG. 6 illustrates an input example of drive control of a conveyance roller.

In step S305, the behavior calculation unit 205 simulates behavior of the flexible medium for a plurality of times under a plurality of different conditions based on an instruction from the user. After starting the simulation, the behavior calculation unit 205 calculates a state (e.g., a position and shape) of the flexible medium on a time step basis to calculate behavior of the flexible medium. Herein, the behavior calculation unit 205 also calculates whether the flexible medium indicates abnormal behavior. The term "abnormal behavior" used herein includes the following states.

A shape of the flexible medium becomes abnormal (e.g., a paper jam state)

Stress that exceeds anticipated stress occurs in a mass-point-spring system

The flexible medium enters an unintended conveyance path

If abnormal behavior occurs, a location in which the abnormal behavior has occurred is stored in a memory such as the storage unit 105, and then the behavior calculation unit 205 performs a simulation under a next condition.

In step S306, a simulation result is displayed.

Figure 7:
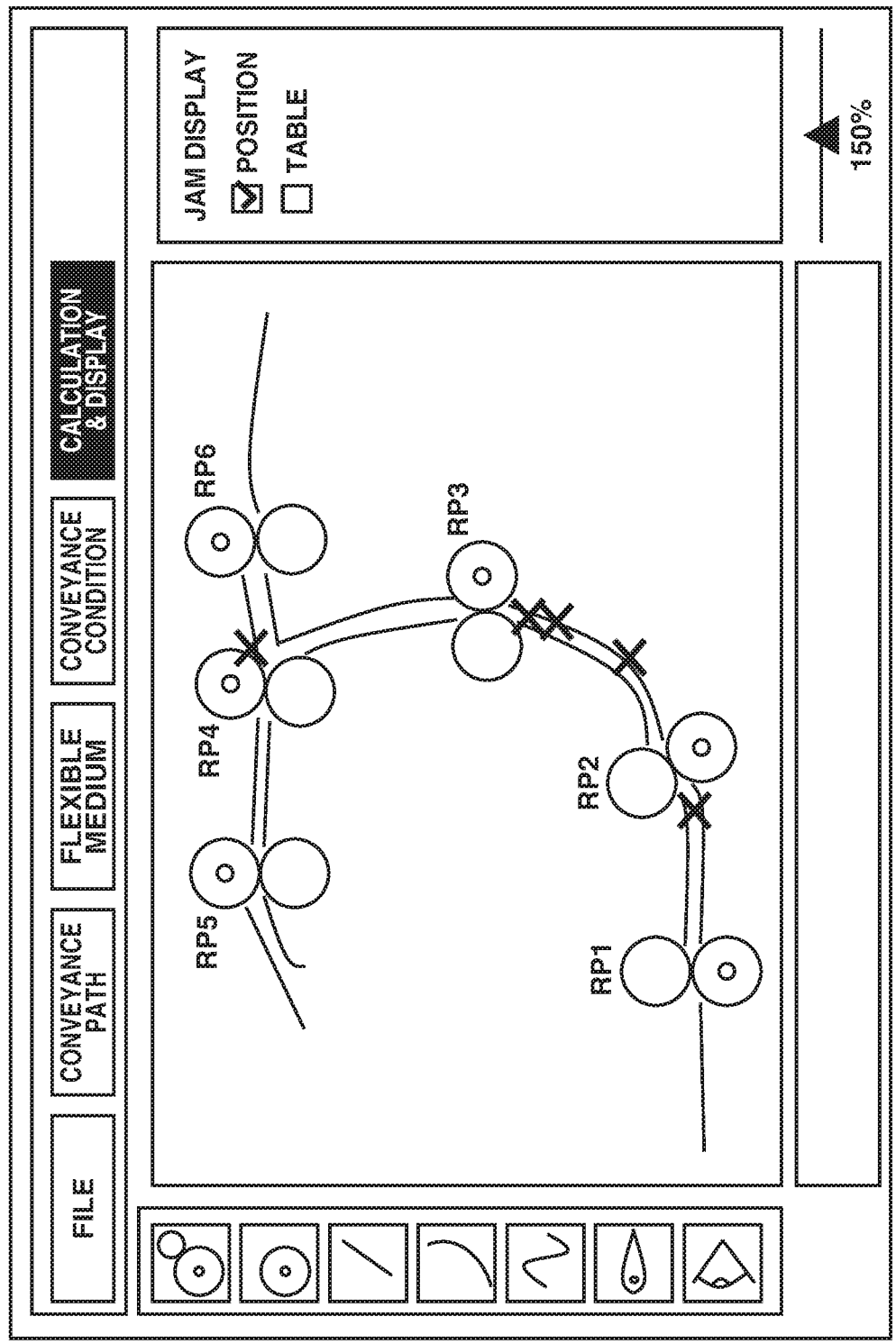
FIG. 7 is a display screen of a simulation result.

FIG. 7 is a display screen that is provided when the display unit 206 displays a simulation result. A cross mark indicates a location in which abnormal behavior of a flexible medium has occurred, in an overlapping manner on a component of the conveyance path set in step S302. The case illustrated in FIG. 7 indicates that the abnormal behavior has occurred in one location between a roller pair (RP) 1 and a RP 2, three locations between the RP 2 and a RP 3, and one location near a RP 4. The user checks such displayed areas, so that the user can readily ascertain a location in which abnormal behavior is liable to occur. Thus, design efficiency can be enhanced.

FIG. 8 is another example of a display screen that is provided when the display unit 206 displays a simulation result. Unlike the display screen illustrated in FIG. 7, a location in which abnormal behavior has occurred is expressed in a table format. Herein, a condition is displayed in association with information (e.g., RP1-RP2) about a location in which abnormal behavior has occurred. Unlike the display screen illustrated in FIG. 7, a condition is displayed. Thus, the use of the display screen illustrated in FIG. 8 enables the user to readily identify a cause of abnormality.

Figure 9:
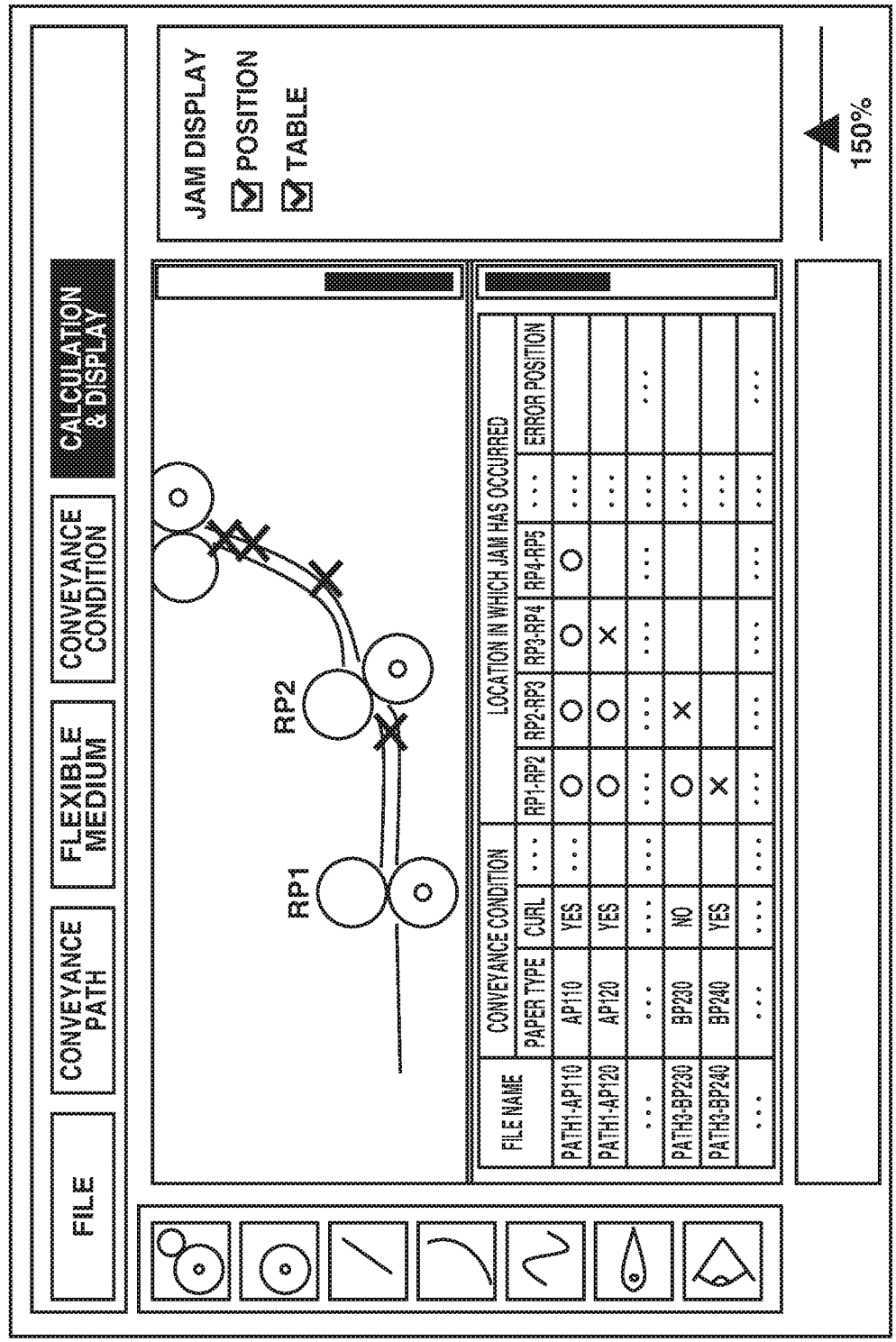
FIG. 9 is a display screen of a simulation result.

FIG. 9 is yet another example of a display screen that is provided when the display unit 206 displays a simulation result. The display screen illustrated in FIG. 9 has a combination of the display of the abnormality on the conveyance path illustrated in FIG. 7 and the display of the table illustrated in FIG. 8. If the user identifies an error position on the conveyance path by using, for example, a mouse, the corresponding row indicating the abnormality in the table is highlighted. Accordingly, the user can ascertain the abnormality at the time of conveyance more easily.

In step S307, the CPU 101 receives an input indicating whether the user is satisfied with the simulation result. If the user is satisfied with the simulation result (YES in step S307), the processing proceeds to step S308 where the processing ends. On the other hand, if the user is not satisfied with the result (NO in step S307), the processing returns to step S302 and the conveyance path is set again.

According to the present embodiment, therefore, a plurality of conditions can be collectively set. Moreover, listing that is used if a simulation result is checked is enhanced, so that user convenience can be enhanced.

Figure 10:
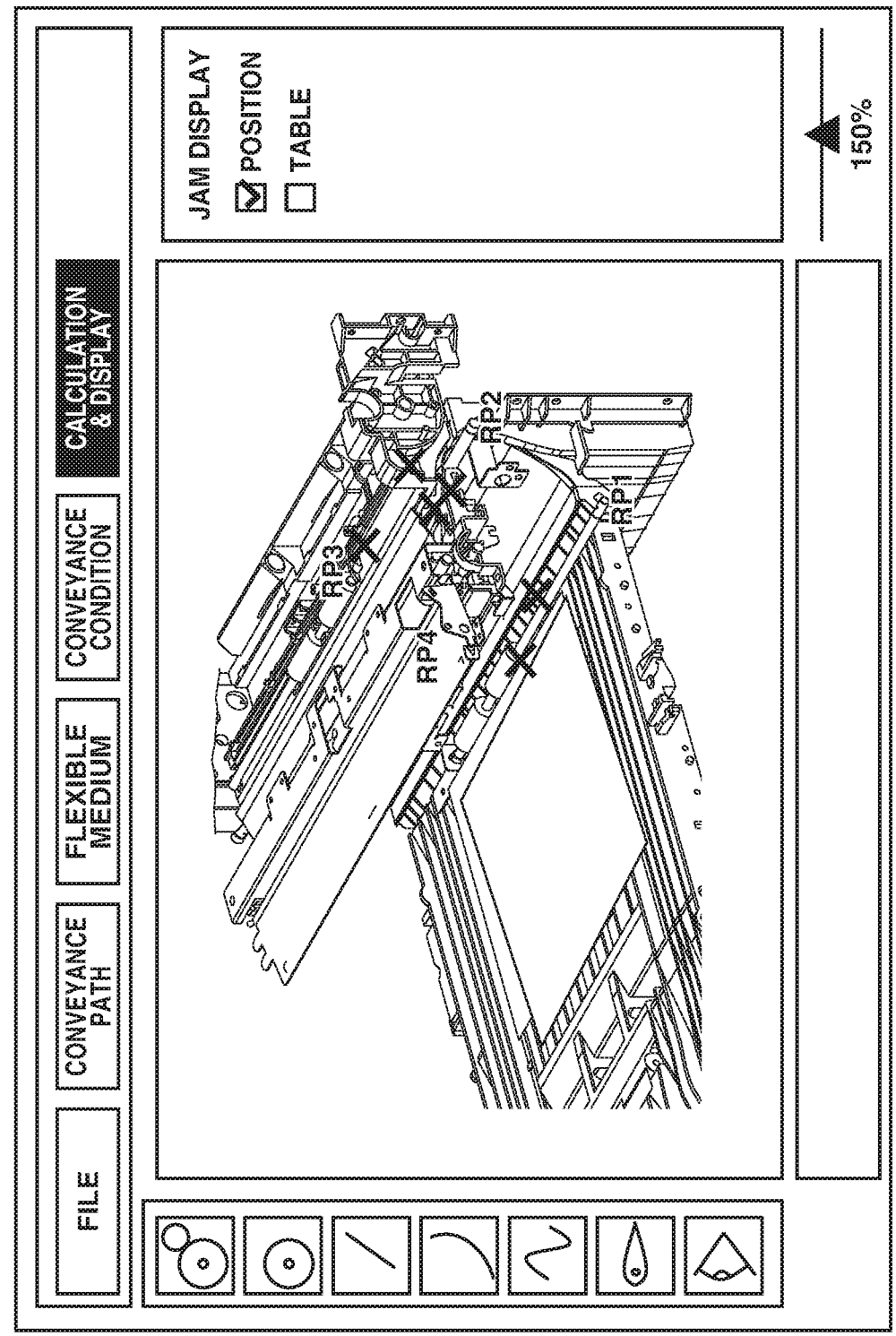
FIG. 10 is a display screen of a simulation result.

The present exemplary embodiment has been described using an example of processing based on two-dimensional (2D) simulation. However, the present exemplary embodiment may be applied to processing based on three-dimensional (3D) simulation. FIG. 10 is an example of 3D simulation corresponding to the example illustrated in FIG. 7.

The configuration of the above-described exemplary embodiment is not limited thereto. Any configuration may be applied as long as a function in the scope of the claims or a function of the configuration of the present exemplary embodiment can be provided. Moreover, the present exemplary embodiment may be applied to a system including a plurality of devices or a single device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-218573, filed Nov. 21, 2018, which is hereby incorporated by reference herein in its entirety.

What is claimed is:

1. An information processing apparatus that simulates behavior of a sheet-shaped flexible medium that moves inside a conveyance path, the information processing apparatus comprising:
   one or more memory devices storing instructions; and
   one or more processors that, upon executing the stored instructions, configures the apparatus to
   simulate behavior of the flexible medium for a plurality of times under a plurality of different conditions, wherein the plurality of conditions includes at least a condition concerning environment, a condition concerning a type of medium, a condition concerning a size of medium, a condition concerning an initial position of medium, and a condition concerning initial deformation of medium; and
   display a component inside the conveyance path together with a plurality of locations in which abnormal behavior of the flexible medium has occurred based on a result of the simulation.

2. The information processing apparatus according to claim 1, further comprising a condition setting unit configured to set the plurality of conditions.

3. The information processing apparatus according to claim 2, wherein the condition setting unit sets the plurality of conditions based on an instruction from a user.

4. The information processing apparatus according to claim 1, wherein the abnormal behavior is at least one of an abnormal shape of the flexible medium, generation of stress that exceeds a predetermined amount, and intrusion of the flexible medium into an unintended conveyance path.

5. An information processing method for simulating behavior of a sheet-shaped flexible medium that moves inside a conveyance path, the information processing method comprising:
   simulating behavior of the flexible medium for a plurality of times under a plurality of different conditions, wherein the plurality of conditions includes at least a condition concerning environment, a condition concerning a type of medium, a condition concerning a size of medium, a condition concerning an initial position of medium, and a condition concerning initial deformation of medium; and
   displaying a component inside the conveyance path together with a plurality of locations in which abnormal behavior of the flexible medium has occurred based on a result of the simulation.

6. The information processing method according to claim 5, wherein, in the displaying, the condition is displayed in association with information about a location in which the abnormal behavior has occurred based on a result of the simulation.

7. The information processing method according to claim 6, wherein, in the displaying, the condition and the information about the location in which the abnormal behavior has occurred are displayed in a table format.

8. The information processing method according to claim 5, further comprising condition-setting for setting the plurality of conditions.

9. The information processing method according to claim 8, wherein, in the condition-setting, the plurality of conditions are set based on an instruction from a user.

10. The information processing method according to claim 5, wherein the abnormal behavior is at least one of an abnormal shape of the flexible medium, generation of stress that exceeds a predetermined amount, and intrusion of the flexible medium into an unintended conveyance path.

11. A non-transitory storage medium storing a program causing a computer to execute an information processing method for simulating behavior of a sheet-shaped flexible medium that moves inside a conveyance path, the method comprising:
    simulating behavior of the flexible medium for a plurality of times under a plurality of different conditions, wherein the plurality of conditions includes at least a condition concerning environment, a condition concerning a type of medium, a condition concerning a size of medium, a condition concerning an initial position of medium, and a condition concerning initial deformation of medium; and displaying a component inside the conveyance path together with a plurality of locations in which abnormal behavior of the flexible medium has occurred based on a result of the simulation.

12. The non-transitory storage medium according to claim 11, wherein, in the displaying, the condition is displayed in association with information about a location in which the abnormal behavior has occurred based on a result of the simulation.

13. The non-transitory storage medium according to claim 12, wherein, in the displaying, the condition and the information about the location in which the abnormal behavior has occurred are displayed in a table format.

14. The non-transitory storage medium according to claim 11, wherein the method further comprises condition-setting for setting the plurality of conditions.

15. The non-transitory storage medium according to claim 14, wherein, in the condition-setting, the plurality of conditions are set based on an instruction from a user.

\* \* \* \* \*